Patented June 16, 1931

1,810,802

UNITED STATES PATENT OFFICE

JOHN T. TRAVERS AND OLIVER M. URBAIN, OF COLUMBUS, OHIO, ASSIGNORS, BY DIRECT AND MESNE ASSIGNMENTS, TO THE OHIO SANITARY ENGINEERING CORPORATION, OF COLUMBUS, OHIO, A CORPORATION OF OHIO

GRANULAR FERTILIZER AND PROCESS OF PRODUCING THE SAME

No Drawing. Application filed April 29, 1929. Serial No. 359,188.

This application is a continuation in part of our co-pending application Serial Number 302,152, filed August 25, 1928.

This invention relates to the provision of a granular fertilizer and process of producing the same.

It is one purpose of the present invention to provide a plant food and fertilizer which will improve the conditions of the soil by increasing its colloidal content and which will further supply to the soil essential plant food elements in such form that they will not be dissipated by leaching out, but will be available for assimilation by plant life throughout an entire season and in some instances for much longer periods.

Further objects of the invention are to provide a fertilizer in granular form which will be sufficiently non-hygroscopic and possess the necessary hardness to permit of its being bagged, shipped and handled without loss, which will be capable of deposit in the soil together with seed without injurious effects on seed germination and plant growth; which will not leach out of the soil, and which will have a dispersion coefficient equal to the rate of root growth of various agricultural products.

The objects of the present invention are particularly attained by providing a fertilizer or plant food composed principally of dispersible colloidal matter and containing substantial quantities of essential plant food elements in relatively insoluble colloidal form.

By the term "dispersible or colloidal" as used in this specfication, it will be understood that we mean dispersible or colloidal in water or the soil moisture.

We have found that it is possible to produce fertilizers conforming to our invention by several methods. A preferred fertilizer base, however, is a sludge product obtained from a process of purification or organic waste liquids such as, for example, domestic sewage, waste liquids discharged from tanneries, canneries, creameries, cheese factories, strawboard factories, sugar beet refineries, and the like. The sludge products employed as base materials in our fertilizer are obtained by treating these organic waste liquors, containing colloidal matter in dispersion, in accordance with the purification process more fully set forth in U. S. Patent No. 1,672,587, which in the main, comprises the incorporation in an organic waste liquor containing colloidal matter in dispersion, of an alkali in such quantity as to maintain the pH of the liquor at a value which will cause all colloids present in the liquor to carry a complete negative charge, adding to the waste liquor an electrolyte producing material, adapted to dissociate and supply positive ions for adsorption by the negatively charged colloids, neutralizing the charge of the colloids to the isoelectric point and the separating of the precipitated colloidal matter from the waste liquor by the incorporation therein of a suitable coagulant.

These sludges obtained from organic waste liquids, in accordance with this process, contain a very substantial percent of re-dispersible colloidal matter. By re-dispersible colloidal matter, as used in this specification, we means precipitated colloidal matter which may be deflocculated and re-dispersed in a soil solution.

In addition to the re-dispersible colloidal matter content, the sludges contain the plant food values, nitrogen, phosphorus and potassium, in such form that the same are not dissipated by leaching, but are available for the plant life over prolonged periods.

In these sludges, the nitrogen is present in the form of proteins which represent re-dispersible colloidal matter. The nitrogen is made available, when the sludge is applied to the soil, by the bacterial decomposition of the proteins which yield, first ammonia and then nitrates. The bacterial decomposition of the proteins is governed, more or less, by the laws of mass action, in that the greater the quantity of available nitrates in the soil, the slower will be the bacterial decomposition of the protein. It therefore follows that as the nitrates are assimilated by the plant life, and the content of nitrates in the soil decreased, the bacterial decomposition of the proteins will be thereby accelerated with a resultant formation of additional nitrates.

The plant food element, phosphorus, is usually present in the sludges as di-basic calcium phosphate, or a complex combination of a protein or potassium with calcium phosphate. The form in which the phosphate will be present in the sludge will, of course, depend upon the character of the organic waste liquid from which the sludge has been derived. For example, if the sludge is that obtained from the treatment of waste liquors from the manufacture of strawboard, the phosphates will be present as di-basic calcium phosphate. If the sludge has been derived from the treatment of a waste liquid such as whey, from the manufacture of cheese, the phosphates will be present as the double salt of potassium and calcium. Whereas, if the sludge has been derived from the waste liquids discharged from an ordinary creamery, the phosphates will be present in the form of casein-calcium phosphate. In any instance, the phosphates of the sludge are present in re-dispersible colloidal form. The phosphates of the sludge, when applied to the soil, are insoluble in water and are therefore not subject to being carried away by surface water due to excessive rains, that is, they are not subject to leaching out. While we are not certain, it is our firm belief that the phosphates are assimilated by the plant life while in colloidal form. We do know that when phosphates in the form in which they are found in the sludges are applied to soil, they are not leached out of the soil, but remain available for the assimilation by the plant life over prolonged periods and that they do ultimately reach the plant life.

The potassium in all these sludges exists as double colloidal salts usually the silicates, but in some cases the phosphates. As in the case of the other plant food values present in the sludges, the potassium is likewise in the forms above given, present in the sludge in re-dispersible colloidal form. It is insoluble and not subject to leaching out.

While these sludges constitute excellent fertilizers without additional ingredients, in some instances we have found that the sludges obtained from certain organic waste liquids do not contain as large a percentage of plant food values as it is desired to impart to a particular soil. To the end that an adequate content of plant food values may be present in the fertilizer, we have devised methods of obtaining such plant food values as nitrogen, potassium and phosphorus in such forms as may be applied to the soil, either singly or in combination with the sludge, which are not subject to leaching out. We provide the plant food element, nitrogen, in the form of the insoluble double silicate, namely, ammonium alumino-silicate, which double silicate, it will be appreciated, is naturally colloidal, while the element, potassium, is provided in the form of potassium alumino-silicate which is also colloidal.

The double silicate, potassium alumino-silicate, may be produced by forming a paste from aluminum hydroxide, sodium silicate, and a potassium salt, mixing the paste at substantially 60° centigrade, then lixiviating this mass to remove soluble matter. After re-drying the resulting substance can be reduced to any desired size of granule, and is ready for use. A sodium salt can be used in lieu of a potassium salt and the final product treated with a brine of a potassium salt which would give a potassium double silicate. The double silicate, potassium alumino-silicate, may also be produced by mixing while at a temperature of 60 degrees C., dilute solutions of sodium aluminate and neutral sodium silicate in such proportions that the mixture contains from 6 to 16% alumina, drying the mixture at a temperature ranging from 80 to 90 degrees C., water washing the mass, re-drying and pulverizing the product and thereafter treating the same with a potassium brine.

The double silicate, ammonium alumino-silicate, may be produced in a more or less analogous manner, i. e., mixing below 20 degrees C., dilute solutions of sodium aluminate and neutral sodium silicate in proportions such that the mixture contains from 6 to 16% alumina, drying the mixture at temperatures ranging from 80 to 90 degrees C., water washing the mass, re-drying and pulverizing the product and thereafter treating the same with an ammonium brine.

To provide the plant food value, phosphorus, in a suitable form, we bind the phosphorus into an insoluble silicate by fusing a mixture of quartz or sand, an alkali carbonate and phosphate rock in the proportions of

|  | Parts |
|---|---|
| Sand or quartz | 20 |
| Alkali carbonate | 20 |
| Phosphate rock | 60 | and treating the fused product with hydrochloric acid and water washing the resultant product to free the same from soluble matter. This product, when added to soils, breaks down slowly, releasing silica and phosphoric acid. Phosphorus may also be fixed as a silicate by mixing silica-gel and metaphosphoric acid in proportions of 1 to 2, drying the mixture at 70 degrees C., and water washing the product with warm water. A transparent crystalline substance, having the formula, $SiO(PO_3)_2$, is obtained. This compound is silicyl phosphate.

In many instances, the sludge products hereinbefore described, as normally produced, will contain plant food values in an amount adequate to satisfy the needs of the soil. Should, however, a particular sludge product prove to be deficient in any of the plant food values, nitrogen, phosphorus or potassium to supply the needs of a particular soil or adapt the same to the requirement of a particular crop, we may incorporate in the sludge a quantity of the appropriate plant food value in the form of ammonium alumino-silicate, silicyl phosphate.

The sludges obtained from polluted organic waste liquids, which we employ in our fertilizer, contain varying percentages of re-dispersible colloidal matter and plant food values. The quantity of re-dispersible colloidal matter and plant feed values present in the sludge products, is largely dependent upon the character of the organic waste liquid treated. Waste liquids from the manufacture of strawboard and from the manufacture of cheese, are particularly rich in plant food values and contain in excess of 70% of re-dispersible colloidal matter. The total plant food values of these sludges will average approximately 10%. Some of the less concentrated organic wastes yield sludges containing less re-dispersible colloidal matter and less plant food values. The plant food values in such sludges can, of course, if desired, be increased by incorporating therein additional plant food values in the form of double silicates as hereinbefore set forth.

Coming now to a consideration of the process for rendering the fertilizer granular in form without detracting from its advantageous characteristics, we have found that in nearly all instances an additional binding agent is necessary in order to form the fertilizer into granules. The binder employed must be one which while effectively bonding the fertilizer in granular form, will permit the granules to disintegrate in the soil moisture. That is, the binder must be miscible with water, must be colloidal, and should preferably contain one or more of the plant food values. The binder best adapted for use in our process is a by-product of the wet rendering process of tankage manufacture known as "stick" in commerce. It is a dark colored viscous liquid of about the consistency of molasses, contains from 9 to 13% nitrogen as ammonia and is colloidal. When dried it contains from 15 to 18% nitrogen as ammonia and is readily redispersible in water to form a true colloidal solution. While we have stated that stick is a by-product of the wet rendering process of tankage manufacture, this is not the only source of stick as it may be made from hair. Tanneries discard hair as a waste product and this offers an abundant source for the manufacture of stick. The term "stick" therefore, as employed herein, is not limited to the source from which this product is obtained.

The quantity of "stick" necessary to employ as a binder will be dependent upon the character of the sludge product employed as the fertilizer base. Sludge from strawboard waste exhibits marked natural binding properties and in fact is capable of being formed into a granular structure without the aid of an extraneous binder. Such sludges as sewage sludge, sludge from beet sugar refinery waste and from tannery waste possess little if any inherent binding properties and therefore require the use of a binder. It will be appreciated that to the extent that a sludge possessing inherent binding properties is substituted in a fertilizer for a sludge requiring an extraneous binder, the quantity of the binder employed can be decreased. For example, if sewage sludge plus added plant food values in the form of double silicates is employed as the fertilizer base, a substantially greater amount of stick is necessary than when the base contains a substantial quantity of sludge possessing inherent binding properties such as from strawboard waste.

We find that for effecting sufficient bonding of such sludges as those derived from sewage, tannery waste, and beet sugar refinery waste, the stick should be employed in approximately the proportions of one part stick to ten parts fertilizer base. It is not desirable to use "stick" in any greater proportions than necessary since when used in excess it increases the hygroscopicity of the resultant fertilizer. Satisfactory bonding without objectionable hygroscopicity can be secured in proportions up to 1 to 4. By substituting for portions of a non-binding sludge in the fertilizer base a sludge having inherent binding properties such as strawboard sludge, the quantity of stick employed can be varied and the character of the product as to hardness and hygroscopicity can be accurately controlled. The control should be such that the fertilizer granules produced will not disintegrate when bagged, shipped and handled or gain in moisture to a degree that will affect their stability.

From the foregoing it is evident that the component parts of the fertilizer may come from many sources, that is portions thereof may represent sludges derived from polluted liquors of varying characteristics, while additional plant food values in the form of colloidal double silicates may be added to compensate for plant food deficiencies in the sludges. It is immaterial insofar as this invention is concerned as to how the constituent components of the fertilizer are combined so long as they are combined in such ratio that the fertilizer will contain in excess of 30% dispersible colloidal matter, the necessary quantity of plant food values and a binder capable of bonding the fertilizer into granular form. The following is one illustrative mixture of constituents to form the fertilizer:

| | Per cent |
|---|---|
| Stick | 10 |
| Sludge from strawboard waste | 40 |
| Sludge from sewage | 30 |
| Sludge from beet sugar refinery waste | 10 |
| Potassium alumino-silicate | 10 |

The mixing should be effected before the sludges are dried to an extent adequate to bring the water content below substantially 60% since upon further drying there is a tendency for the precipitated colloidal matter in the sludge to coagulate from which condition it can not be easily dispersed. The stick when added acts to prevent such coagulation during the drying process. After the constituents have been thoroughly mixed the mass is dried at a temperature of approximately 105° C., and then crushed to pass a 10 mesh screen but preferably not to pass a 20 mesh screen. The size of the granules desired will be dependent to some extent, upon the character of crop with the seed of which they are to be deposited in the soil.

A fertilizer mixed from the constituents and in the proportions set forth showed on analysis:

| | Per cent |
|---|---|
| Ammonia | 4.50 |
| Phosphoric acid | 6.60 |
| Potash | 2.50 |
| Dispersible | 80.50 |

In actual tests with fertilizer manufactured in accordance with the invention, it has been found that the fertilizer has a soil dispersion coefficient somewhat in excess of the rate of plant root growth, that its moisture content will increase only about 4% when maintained in an atmosphere saturated with moisture for ten days and that it can be bagged, shipped and handled without loss. Its form and character permits it to be deposited with crop seed through the medium of drills employed for planting the crop. Due to its dispersion coefficient the available plant food keeps pace with the plant growth and since the plant food is present in colloidal form it does not go into solution in the surface water and hence does not leach out.

It is to be further understood that when our fertilizer is applied to a soil, portions of the sludge content thereof undergo bacterial decomposition, forming organic acids. As is well known, pulverized limestone is conventionally used to sweeten soil and is furthermore usually present in the sludge of our fertilizer, and, therefore, the organic acids resulting from the bacterial decomposition referred to react with the limestone or calcium carbonate forming organic salts of calcium, which base exchange with the alumino silicates both of aluminum and potassium to release nitrogen or potassium as the case may be. The silicyl phosphate is also susceptible to base exchange to release phosphoric acid. There is thus a definite coaction in the soil between the several ingredients of the fertilizer.

The mixture given above is merely illustrative as it is evident that the component constituent going to make up the fertilizer may be derived from various sources and combined in varying proportions.

While the fertilizer is preferably employed in granular form, it will be appreciated that where it is not desired to add the fertilizer at the time of planting, it can be employed to advantage in other forms.

From the foregoing, it is evident that we have provided a novel granular fertilizer adapted for deposit in the soil with crop seed and a novel process for producing such fertilizer. The detailed description herein contained is explanatory and illustrative only of the invention, the scope of which is comprehended solely in the appended claims.

What we claim for our invention is:—

1. A granular fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a colloidal binder in the form of stick.

2. A granular fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein added plant food values in colloidal form, and a colloidal binder in the form of stick.

3. A granular fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of ammonium alumino-silicate, potassium alumino-silicate and silicyl phosphate, and a colloidal binder in the form of stick.

4. A granular fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of ammonium alumino-silicate and a colloidal binder in the form of stick.

5. A granular fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of potassium alumino-silicate and a colloidal binder in the form of stick.

6. A process for making a granular fertilizer comprising mixing a sludge containing substantial quantities of dispersible colloidal matter precipitated from an organic waste liquid, containing organic colloidal matter in dispersion, by the ionization in the organic waste liquid of an electrolyte to supply ions of opposite sign to that of the charge carried by the colloids in the waste liquid, prior to the exclusion of moisture therefrom to a point below substantially 60% with a colloidal binder in the form of stick in the proportions of not in excess of one part stick to four parts sludge, drying to a temperature of approximately 100° C. and reducing to granular form.

7. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid.

8. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein added plant food values in colloidal form.

9. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of ammonium alumino-silicate, potassium alumino-silicate and silicyl phosphate.

10. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of ammonium alumino-silicate.

11. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of potassium alumino-silicate.

12. A fertilizer containing a substantial quantity of dispersible organic colloidal matter in the form of sludge precipitated from a polluted organic waste liquid, containing organic colloidal matter in dispersion, by the ionization in the organic waste liquid of an electrolyte to supply ions of opposite sign to that of the charge carried by the colloids in the waste liquid, said sludge having incorporated therein a substantial quantity of silicyl phosphate.

JOHN T. TRAVERS.
OLIVER M. URBAIN.